(12) United States Patent
Bruckner et al.

(10) Patent No.: US 10,817,362 B1
(45) Date of Patent: Oct. 27, 2020

(54) AUTOMATIC CONTEXTUALIZATION FOR IN-SITU DATA ISSUE REPORTING, PRESENTATION AND RESOLUTION

(71) Applicant: Tamr, Inc., Cambridge, MA (US)

(72) Inventors: Daniel Meir Bruckner, San Francisco, CA (US); Gideon Goldin, Cambridge, MA (US); Matthew Holzapfel, Bedford, MA (US); Nicolas Malfroy-Camine, Wakefield, MA (US)

(73) Assignee: TAMR, INC., Cambridge, MA (US)

( * ) Notice: Subject to any disclaimer, the term of this patent is extended or adjusted under 35 U.S.C. 154(b) by 0 days.

(21) Appl. No.: 16/800,354

(22) Filed: Feb. 25, 2020

Related U.S. Application Data

(60) Provisional application No. 62/948,241, filed on Dec. 14, 2019.

(51) Int. Cl.
*G06F 11/00* (2006.01)
*G06F 11/07* (2006.01)
*G06F 16/28* (2019.01)
*G06F 16/2457* (2019.01)
*G06F 11/30* (2006.01)

(52) U.S. Cl.
CPC ...... *G06F 11/0787* (2013.01); *G06F 11/3086* (2013.01); *G06F 16/24573* (2019.01); *G06F 16/287* (2019.01)

(58) Field of Classification Search
CPC ............. G06F 11/0787; G06F 11/3086; G06F 16/24573; G06F 16/287
See application file for complete search history.

(56) References Cited

U.S. PATENT DOCUMENTS

| 6,629,267 B1 * | 9/2003 | Glerum | G06F 11/0715 |
| | | | 714/26 |
| 10,540,223 B1 * | 1/2020 | Johansson | G06F 11/0751 |
| 2012/0137182 A1 * | 5/2012 | Zhang | G06F 11/0778 |
| | | | 714/48 |

(Continued)

OTHER PUBLICATIONS

Wikipedia entry for "Tableau Software." Retrieved from web page: <https://en.wikipedia.org/wiki/Tableau_Software>, download date: Feb. 19, 2020, last edited: Jan. 21, 2020, 6 pages.

(Continued)

*Primary Examiner* — Joshua P Lottich
(74) *Attorney, Agent, or Firm* — Panitch Schwarze Belisario & Nadel LLP (57) ABSTRACT

Structured metadata is automatically captured regarding issues reported by a user when the user interacts with application software for presentation, analysis, or management of structured data. The reported issues correspond to structured data that is displayed by the application software. During user interaction with the application software, a user interface display screen is presented that includes one or more fields for reporting an issue with respect to structured data that is presently being displayed by the application software. Structured metadata is then automatically captured related to the reported issue. The structured metadata includes at least a location within the structured data for the reported issue. Records are stored of each reported issue in a database. Each record includes the reported issue, and the automatically captured structured metadata related to the reported issue.

5 Claims, 9 Drawing Sheets

START

User invokes data issue plugin

Plugin gathers context from application and user

Plugin infers related metadata, using application and issues API

Plugin submits issue via issue API

Issue management system stores issue and associated metadata in the issue database

END

Workflow for metadata gathering in context for issue gathering (56) References Cited

U.S. PATENT DOCUMENTS

2017/0161138 A1* 6/2017 Oleynikov .......... G06F 11/0769
2019/0116178 A1* 4/2019 Coffey ................. H04L 9/3239
2019/0235942 A1* 8/2019 Flohr .................. G06F 11/0778

OTHER PUBLICATIONS

Wikipedia entry for "Usersnap." Retrieved from web page: <https://en.wikipedia.org/wiki/Usersnap>, download date: Feb. 19, 2020, last edited: Oct. 3, 2019, 2 pages.

* cited by examiner

Figure 1: Tableau plugin while reporting an issue

Figure 2: An issue reported from the Tableau plugin, in the queue

Figure 3: Major architectural components of issue submission and review

Figure 4: Workflow for metadata gathering in context for issue gathering

Figure 5: Issues displayed in context by the Tableau plugin

Figure 6: Issues displayed in context by the Chrome plugin

Figure 7: workflow for identifying and displaying relevant issues in optimal location Figure 8: User reported issues and assignments Figure 9: User reported issues and assignments filtering

AUTOMATIC CONTEXTUALIZATION FOR IN-SITU DATA ISSUE REPORTING, PRESENTATION AND RESOLUTION

CROSS-REFERENCE TO RELATED APPLICATIONS

This application claims the benefit of U.S. Patent Application No. 62/948,241 filed Dec. 14, 2019, the disclosure of which is hereby incorporated by reference herein in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Many application software programs exist that are used for presentation, analysis, or management of structured data. One example of such a program is Tableau®, which is commercially available from Tableau Software, Inc. Tableau is a data visualization tool used in the Business Intelligence (BI) industry. Other examples of application software programs that are used for presentation, analysis, or management of structured data include Salesforce® and Microsoft® Excel®. All of these software programs provide user interface display screens for conveying the structured data to a user. If a user identifies an issue with the structured data, such as an error or potential error, it is desirable to report the issue to an appropriate person or location within the business that is using the software program so that it can be promptly reviewed and corrected, if necessary. However, reporting mechanisms for doing so are often not built into these types of software programs. Even when a reporting mechanism exists, it may not capture sufficient information regarding the context of the issue to allow for efficient processing, reporting, and resolution of the issue.

Some tools provide application embeddings (e.g., Usersnap®) to allow users to capture issues in-situ, without having to leave the context of their application. While these tools capture limited context (e.g., screen resolution, software version), they do not necessarily capture information required to resolve complex data issues.

Furthermore, after an issue is reported, it may take awhile to resolve the issue. In the meantime, many other users may subsequently view the same structured data without being aware that one or more issues regarding the structured data has been previously reported.

The present invention addresses these problems via a plug-in (plugin) module solution that seamlessly interfaces with any application software program that is used for presentation, analysis, or management of structured data.

BRIEF SUMMARY OF THE INVENTION

Preferred embodiments of the present invention automatically capture structured metadata regarding issues reported by a user when the user interacts with application software for presentation, analysis, or management of structured data. The reported issues correspond to structured data that is displayed by the application software. During user interaction with the application software, a user interface display screen is presented that includes one or more fields for reporting an issue with respect to structured data that is presently being displayed by the application software. Structured metadata is then automatically captured related to the reported issue. The structured metadata includes at least a location within the structured data for the reported issue. Records are stored of each reported issue in a database. Each record includes the reported issue, and the automatically captured structured metadata related to the reported issue.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

The present invention is described in the context of plugin software module referred to as Tamr Steward® (Steward), which is commercially available from Tamr, Inc. Steward is a collaborative feedback system for data and analytics. It allows data teams to capture feedback from data consumers within the tools they work, automatically capturing and sharing metadata about the issues to accelerate resolution times. Feedback (i.e., reported issues) gets reviewed, prioritized, and discussed within a central queue, creating a single view of all the activity in-flight to improve data and analytics.

This patent application includes an Appendix having a file named appendix689422-7U1.txt, created on Feb. 18, 2020 and having a size of 8,063 bytes. The Appendix is incorporated by reference into the present patent application. One preferred embodiment of the present invention is implemented via the source code in the Appendix. The Appendix is subject to the "Copyright Notice and Authorization" stated above.

The Appendix includes the following parts of the Steward software code:

Part 1: A representative example code snippet for the Steward Issue structure.

Part 2: A representative example pseudocode for submitting issues from a Business Intelligence tool, such as Tableau.

Part 3: A representative example pseudocode for submitting issues from the Chrome extension.

Part 4: A representative example pseudocode for getting issues in context of a report in a Business Intelligence tool (e.g. Tableau).

Part 5: A representative example pseudocode for getting issues in context of a URL from the Chrome extension.

The present invention is described in the environment of a plugin for Tableau. Embodiments are also described in the environment of a plugin for a Chrome® browser, since browsers are often used to present structured data. However, the scope of the present invention is not limited to these examples, and the present invention may operate in conjunction with any application software program that is used for presentation, analysis, or management of structured data.

One preferred embodiment of the present invention automatically captures and collates structured metadata when users identify an issue regarding structured data that is being displayed by application software.

Figure 1:
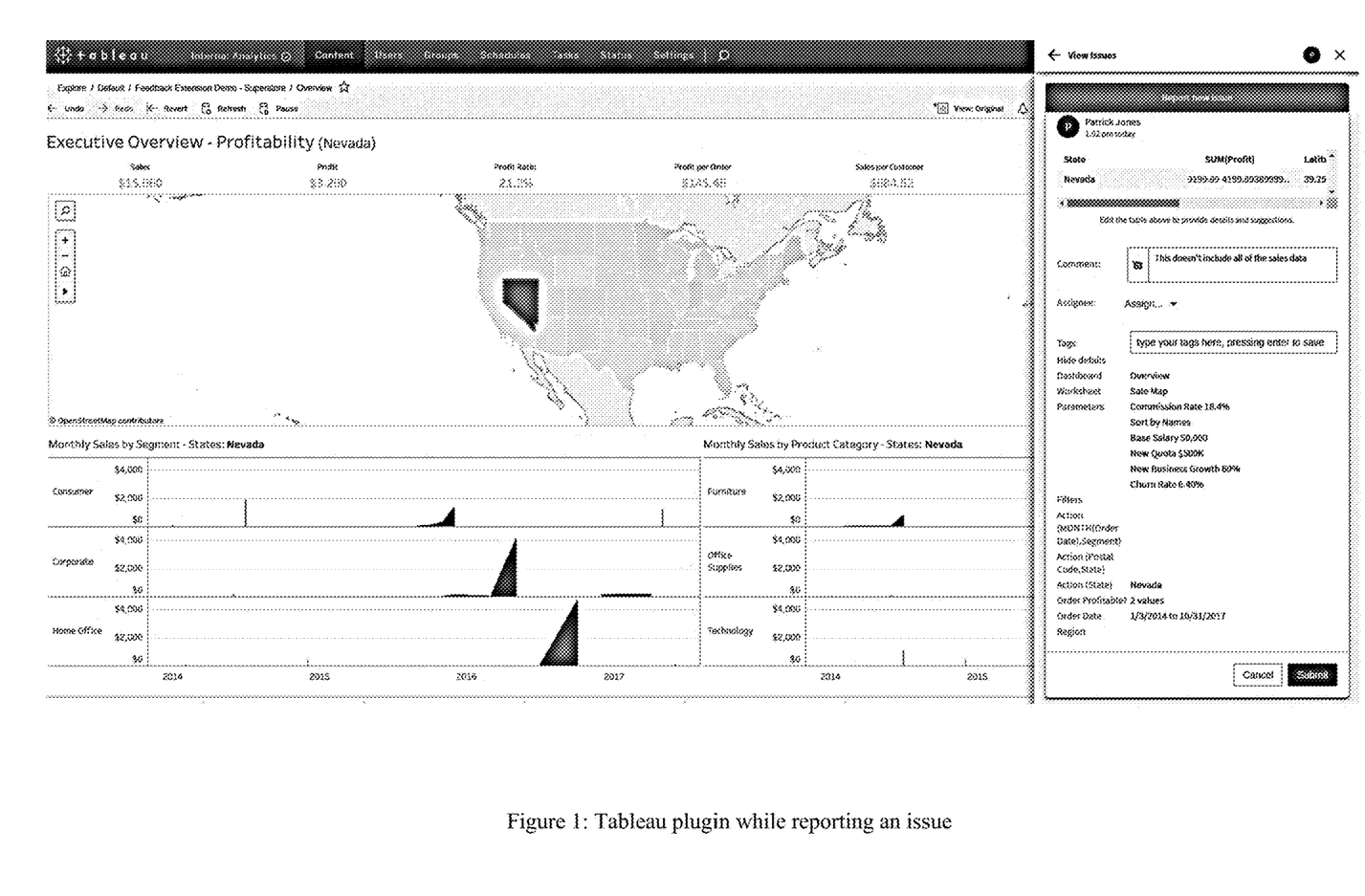
FIGS. 1 and 2 are user interface display screens for illustrating preferred embodiments of the present invention.

FIG. 1 shows a Tableau plugin as it appears while reporting an issue in context. In this case, the Tableau user, Patrick Jones, is viewing a profitability dashboard, with the state of Nevada selected. The user believes that the monthly sales numbers do not include all of the sales data. Accordingly, the user files an issue stating that the dashboard doesn't include all of the sales data. The system automatically gathers the context in which this issue is submitted.

Figure 2:
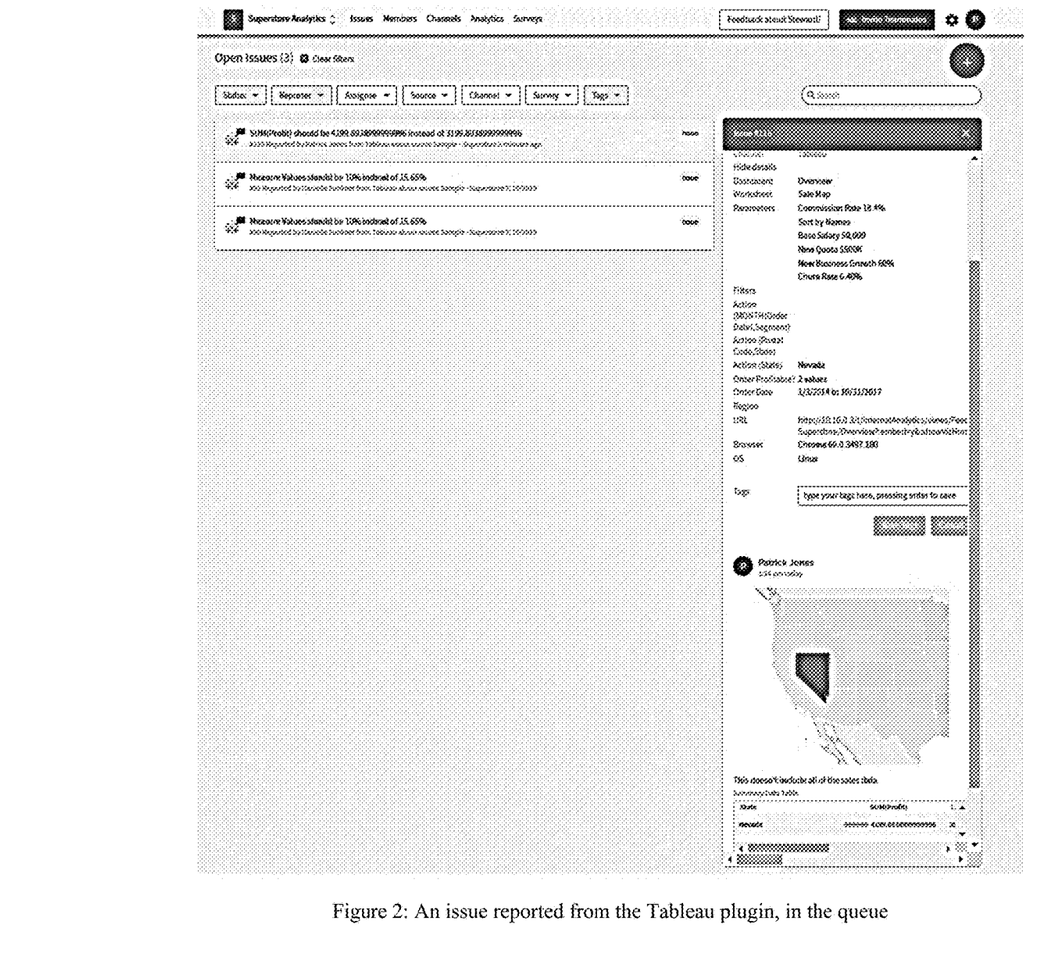

FIG. 2 illustrates an issue reported from the Tableau plugin, in a queue of open (i.e., unresolved) issues. FIG. 2 shows the issue reported in FIG. 1 as it has been gathered and appears in the queue. Note that metadata regarding the user-specified issue description (reported issue) are collected and reported automatically. Here, the metadata includes the application software (Tableau), dashboard, data, and current selection.

By automatically capturing arbitrarily structured metadata (e.g., underlying data source, logs), and by then running a query in a proprietary knowledge base to collate additional information (e.g., candidate resolvers, source popularity), administrators can better prioritize, assign and resolve issues, ultimately saving time and effort as their need to manually track down the data and/or user for more context is dramatically reduced. The following overview is provided for one preferred embodiment of the present invention:

STEP 1: Users interact with a graphical user interface/application program interface (GUI/API) to submit a data issue by specifying the data-in-question.

The method then collects context of the issue from its containing application/environment, including but not limited to: the data, the type of issue (e.g., duplicate record, incorrect format), its containing row/column and/or containing element, its underlying data source, the reporter, time and date, software it was reported from and its version, operating system and its version, screen resolution, any (error) logs present at the time, screenshots, and relevant images (captured automatically or manually). This can be done using application-specific APIs, in the case of an application such as Tableau; or using XPath, JavaScript, and/or the browser's document object module (DOM) in the case of a generic browser extension. Part 2 and Part 3 of the Steward software code show sample implementations of this step.

STEP 2: The method then uses the information in the reported issue to form a query with the goal of gathering related metadata not immediately available. Examples include, but are not limited to the following items:

a. Data: e.g., the system may attempt to classify the data as belonging to one of a number of entities (e.g., Customer, Part, Address, Name). For example, it may determine that an issue pertains to an Email address based on similarities with existing entities.

b. Application: e.g., how many users use the application and how often. For example, it may determine that the reporting application (e.g., Tableau) is used daily by at least 3,000 users.

c. Source: e.g., How many users use the source data and how often. A given source may feed several applications (e.g., Tableau, and Looker™ (business intelligence software and big data analytics platform). This information helps administrators prioritize issue resolution as it is important to resolve issues for sources in high-demand rather than relatively unused sources. If a data source is not supplied, the query may rely on data and application information to induce source information by comparing against existing sources.

d. Reporter: Each time a user views a source or application, their view is tracked. When a reporter submits an issue, the query is run against this information to determine how often the user has reported issues in total and about the source and/or application and/or data in question.

e. Candidate resolvers: the query polls an internal database of users to generate suggestions for who might be best suited to work on the issue by evaluating things like how often the user has resolved issues from the same source or about the same entity. An aggregate of user activity is maintained to track and display how often users submit, resolve (e.g., fix) and are assigned issues and can be used to help drive dynamic filtering of issues based on users. Based on this information, candidate resolvers can more easily be identified.

Figure 8:
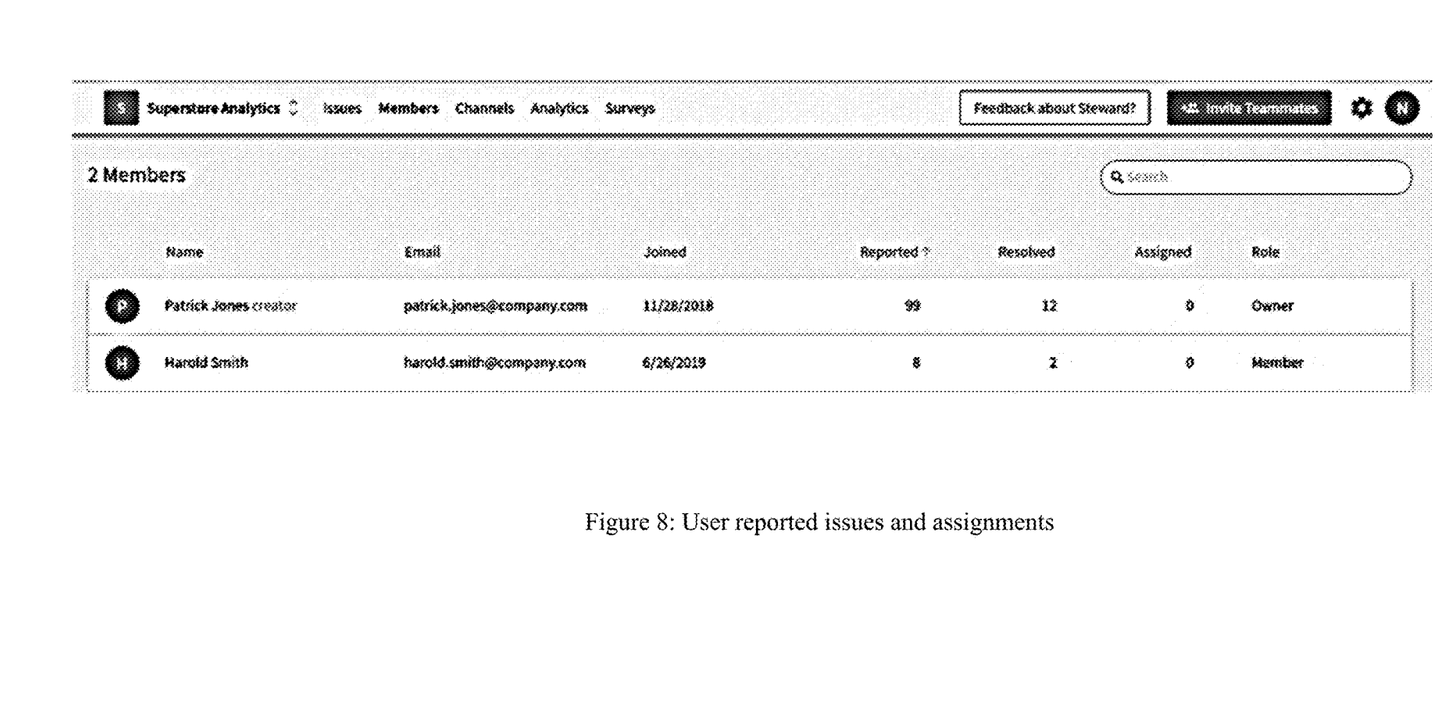
FIGS. 8 and 9 are additional user interface display screens for illustrating preferred embodiments of the present invention.
Figure 9:
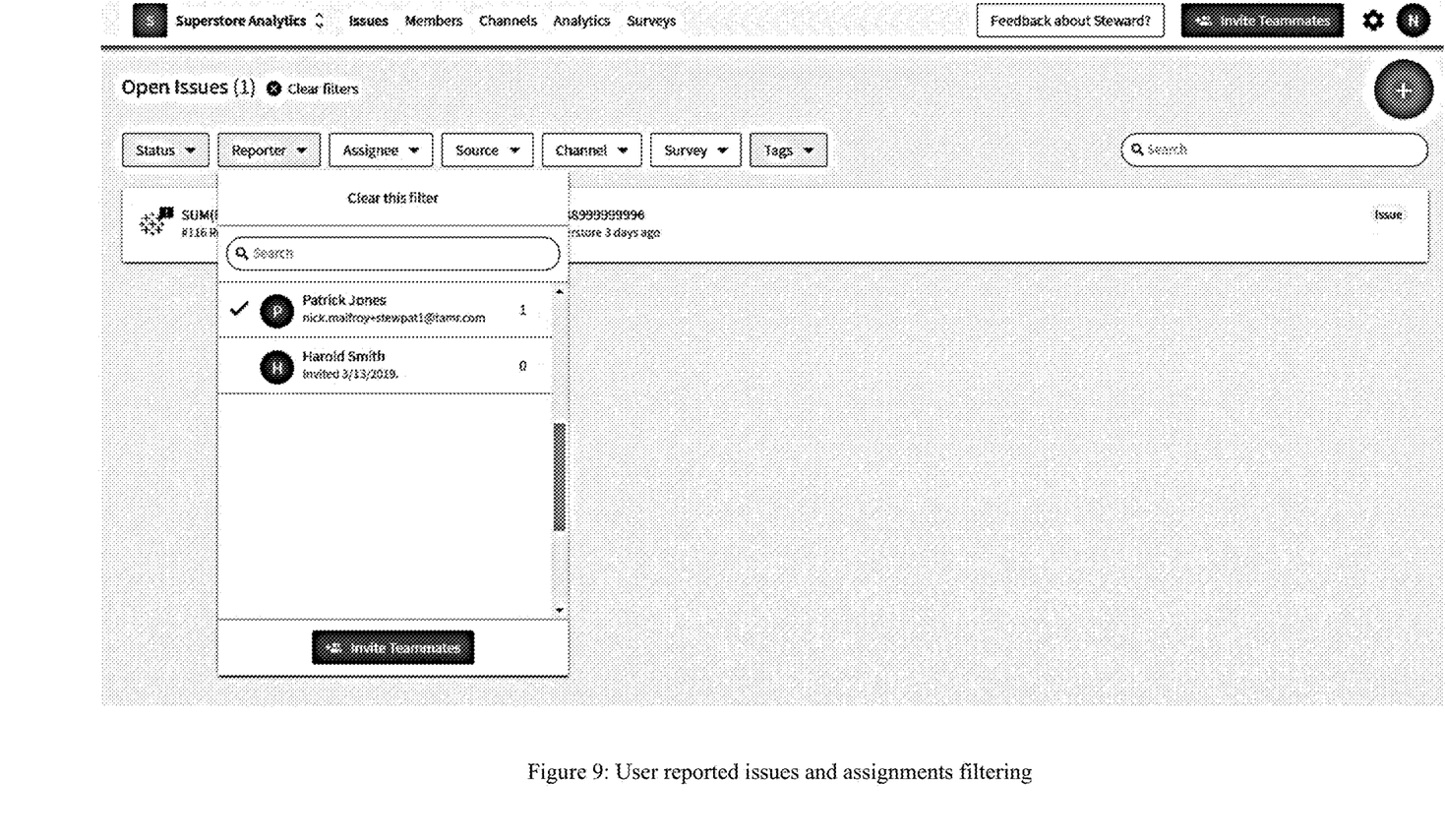

FIG. 8 illustrates user reported issues and assignments. FIG. 9 illustrates user reported issues and assignments filtering.

STEP 3: The information gathered at the time of issue reporting is combined with inferred information and the two are stored as properties of the issue, such that administrators can best prioritize and resolve said issue. Part 1 of the software code shows a sample implementation.

Figure 3:
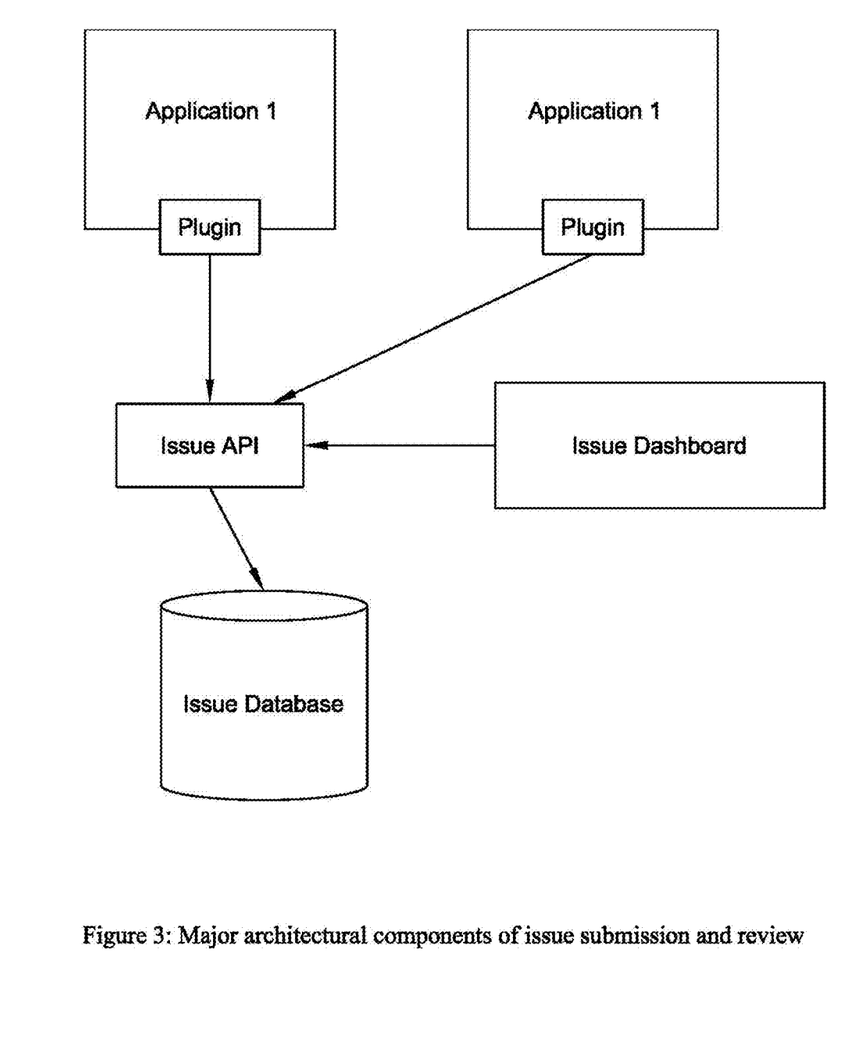
FIG. 3 is a schematic diagram of one preferred embodiment of the present invention.

FIG. 3 shows major architectural components of issue submission and review. Application 1 and Application 2 each have a Steward plugin which report to an Issue API, which is in communication with an Issue Dashboard and an Issue Database. The plugin is a computer program product that is embodied in the form of computer executable code contained on a non-transitory computer-readable medium (e.g., read-only memory, random-access memory, electronically-programmable memory, disk memory, flash memory), wherein the code is executed by a processor and causes the processor to implement the various operations described herein.

Figure 4:
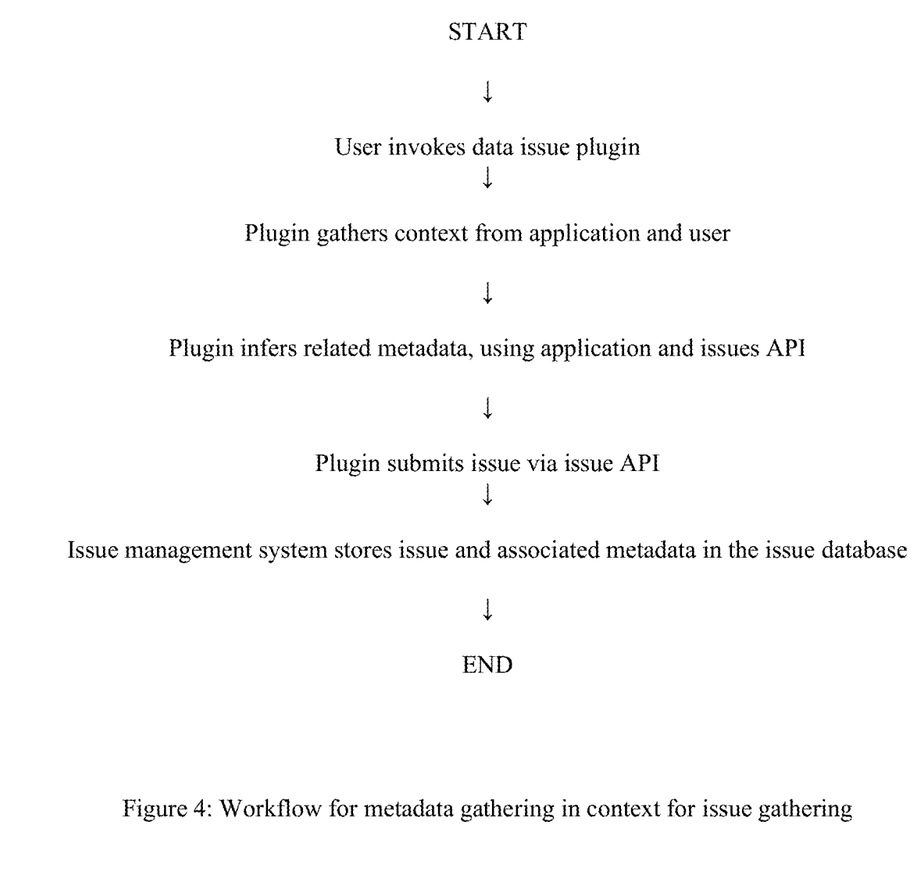
FIG. 4 is a flowchart for implementing metadata gathering in accordance with preferred embodiment of the present invention.

FIG. 4 shows workflow for metadata gathering in context for issue gathering, and operates as follows:
Step 1: User invokes data issue plugin.
Step 2: Plugin gathers context from application and user.
Step 3: Plugin infers related metadata, using application and issues API.
Step 4: Plugin submits issue via issue API.
Step 5: Issue management system stores issue and associated metadata in the Issue Database. (The Issue management system includes the issue API, the Issue Dashboard, and the Issue Database.)

The present invention also provides an embodiment that, given an issue and its metadata, determines the optimal location(s) to display it and then does so. This is referred to herein as "Issues in Context."

Figure 5:
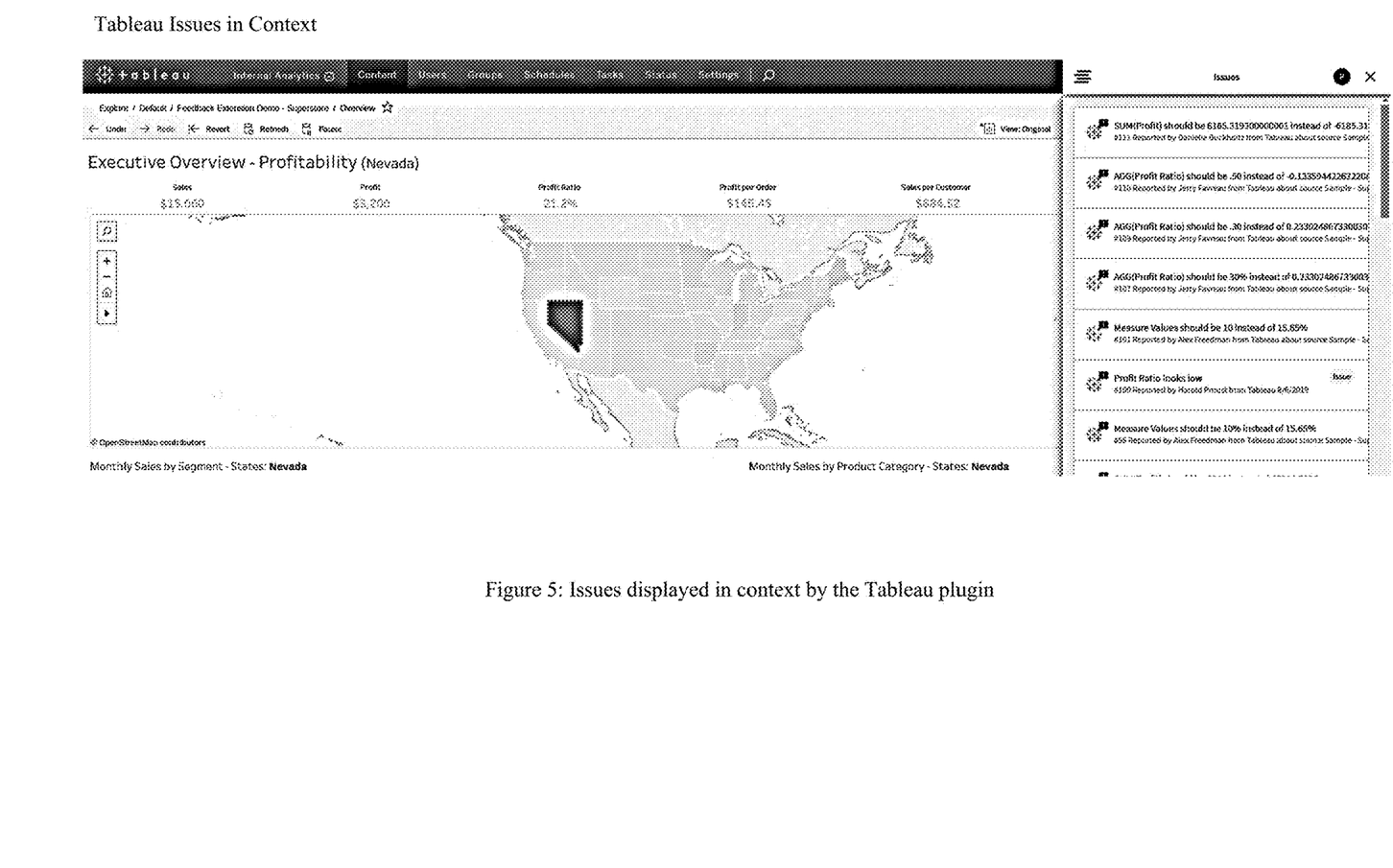
FIGS. 5 and 6 are additional user interface display screens for illustrating preferred embodiments of the present invention.

FIG. 5 illustrates issues displayed in context by the Tableau plugin. When the user navigates to the page, the issue plugin shows the number of issues relevant to the page. When the user selects the state of Nevada, the issue plugin shows the number of issues relevant to the page and the selected element, or simply an indicator (e.g., "!" symbol) that there are one or more issues. For example, the number or indicator may be superimposed on the state of Nevada (not shown in FIG. 5). The user can then open the plugin to see a detailed list of issues related to the selected element, in this case the state of Nevada. The opened plugin is the Issues window shown on the righthand side of the display screen in FIG. 5.

Figure 6:
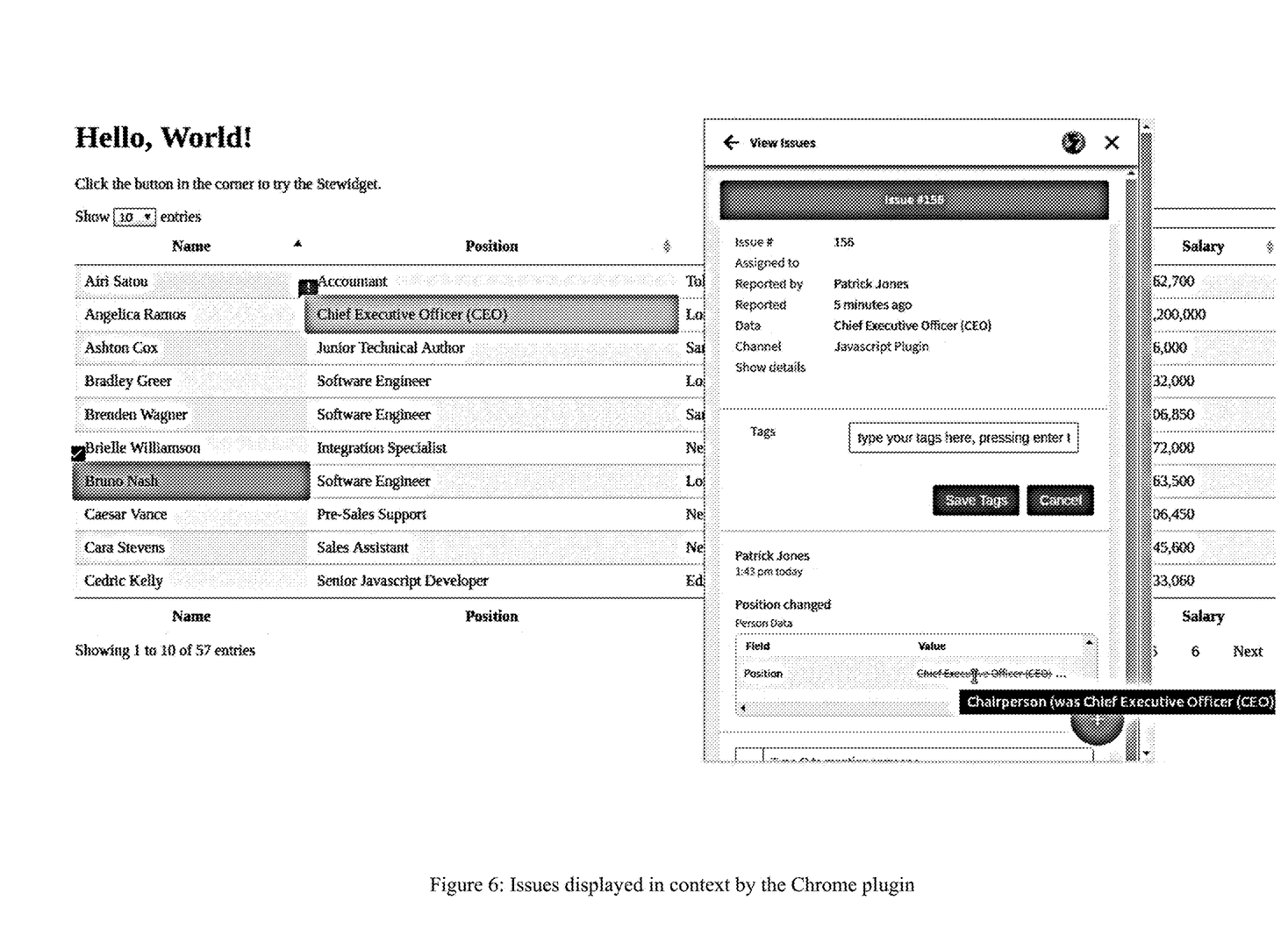

FIG. 6 illustrates issues displayed in context by the Chrome plugin. On the second row, the plugin shows (via highlighting) that there is an unresolved issue relating to the Position field on that row. The user can open the plugin for details of the unresolved issue. On the seventh row the plugin shows (via highlighting) that there is a resolved issue relating to the Name field on that row. In one embodiment, the resolved issue(s) are only highlighted for the issues that were originally reported by the user who is currently viewing the displayed data. Thus, in the example of FIG. 6, if a user other than Patrick Jones viewed the displayed data, only the unresolved issue relating to the Position field would be highlighted.

Data issues are often reported needlessly because the issue has already been reported. Consumers don't realize the issue has already been reported because they are not willing and/or able to search for the issue. By strategically determining where and how to show existing issues, the present invention reduces unwanted redundancy in issue reporting while also giving consumers a sense of data-quality at a glance. For example, the user of a web application might see in their browser (via a software extension) that the current page they are visiting has a total of five issues. They can see these issues in a list and/or in the actual web page overlayed on the data objects that they correspond to. For each issue, they can view relevant metadata, for example a numeric badge indicating how many colleagues have voted for resolution of the given issue. Users can choose to view subsets of issues, for example, by only showing issues within the selected portions of the display screen.

A methodology for identifying and displaying relevant issues in an optimal location is as follows:

STEP 1: As users navigate to an application that is supported by this method, the application and URL are compared against a database of issues, and associated issues are determined based on whether they are reported from the same application and/or underlying data source. In the case of Tableau, the application may not have a URL, but has other location metadata available via application-specific API's (e.g., data source) that provide the necessary information for finding relevant issues.

STEP 2: The method then determines all relevant location(s) of the issue. If this location was previously captured as an element in a web page's DOM, the location is already given. If this location was previously captured as an element relative to its data container (e.g., a cell at a specific row and column), then the system will then infer the corresponding location by evaluating the data present on-screen. This exercise can present as a non-trivial data matching exercise using known prior art techniques. If the location was not previously captured, then a similar matching algorithm must be run in order to determine a possible location. In the event that a location is not confidently identified, the method defaults to presenting the item in a standard list.

STEP 3. The method then, via an integration to supported applications (e.g., a web browser, a business intelligence/visualization tool), invokes an API or injects code in order to visually highlight specific locations, overlaying them with the relevant issue information (e.g., issue title, number of votes, and a facility to see more details in another or an expanding pane).

Part 4 and Part 5 of the of the Steward software code show sample implementations of these steps.

Figure 7:
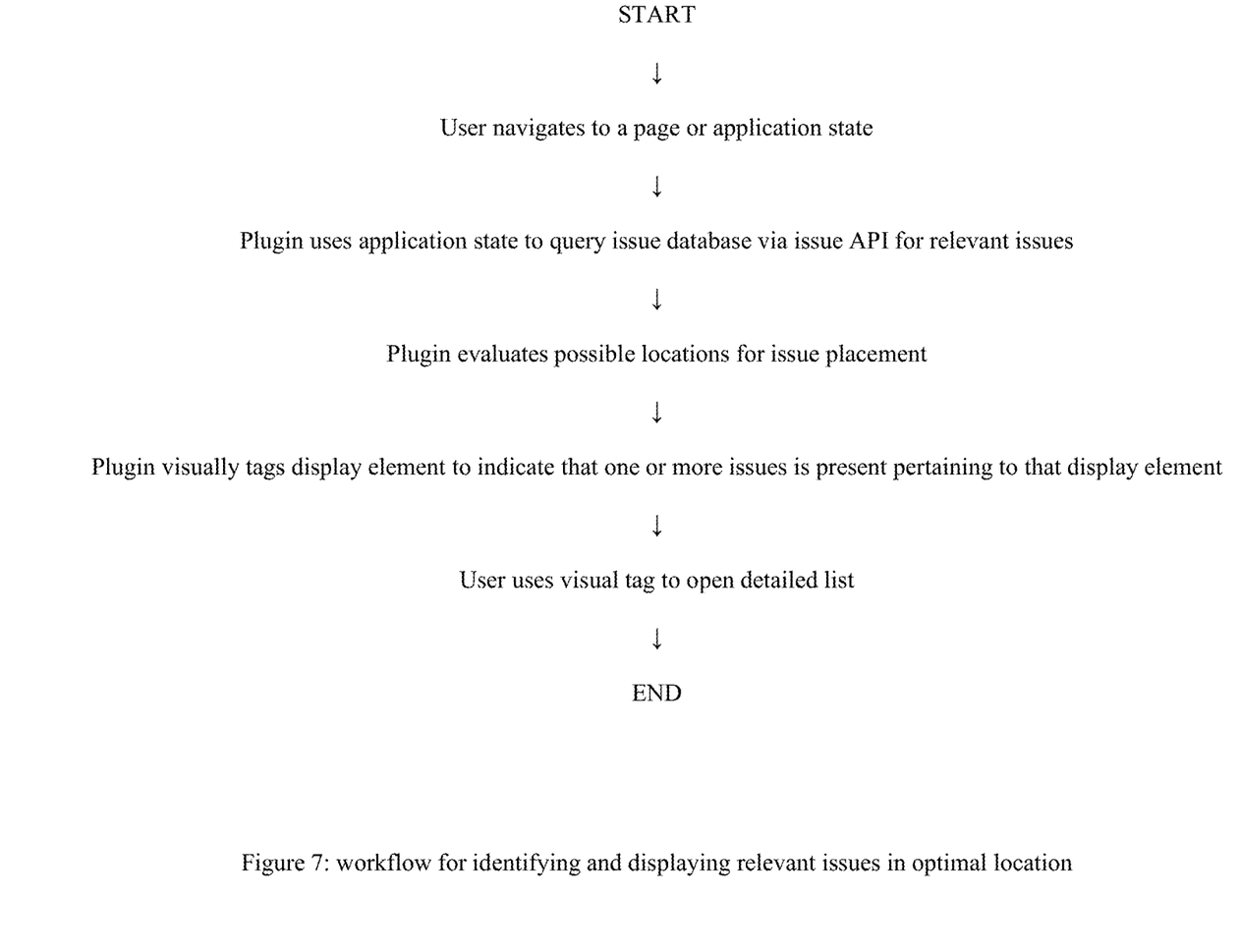
FIG. 7 is a flowchart for implementing identification and display of relevant issues in accordance with one preferred embodiment of the present invention.

FIG. 7 shows a workflow for identifying and displaying relevant issues in optimal location(s), and operates as follows:

Step 1: User navigates to a page or application state.

Step 2: Plugin uses application state to query Issue Database via issue API for relevant issues.

Step 3: Plugin evaluates possible locations for issue placement.

Step 4: Plugin visually tags display element to indicate that one or more issues is present pertaining to that display element.

Step 5: User uses visual tag to open detailed list.

The present invention is unique in that it is able to show issues at proper locations without users having had to specify these locations. This also implies that if a data issue was captured with location information, the method can present it there but also other locations it may manifest without explicit instruction (for example, in both a table and visualization that are synchronized via brushing and linking). If the location of reporting is provided, it can be visually distinguished in order to help provide additional context and insight to users.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

What is claimed is:

1. A computer program product for automatically capturing structured metadata regarding issues reported by a user when the user interacts with application software for presentation, analysis, or management of structured data, wherein the reported issues correspond to structured data that is displayed by the application software, the computer program product comprising a non-transitory computer-readable storage medium tangibly embodying non-transitory computer-executable program instructions thereon that, when executed, causes a computing device to:
   (a) during user interaction with the application software, invoke a user interface display screen that includes one or more fields for reporting an issue with respect to structured data that is presently being displayed by the application software prior to the user interface display screen being invoked, wherein the user interface display screen is invoked by the user;
   (b) automatically capture structured metadata related to the reported issue, the structured metadata including at least a location within the structured data for the reported issue; and
   (c) store records of each reported issue in a database, each record including:
      (i) the reported issue, and
      (ii) the automatically captured structured metadata related to the reported issue.

2. The computer program product of claim 1 wherein the computer-executable program instructions, when executed, further cause the computing device to:
  (d) during user interaction with the application software:
    (i) track the location of structured data that is currently being displayed by the application software,
    (ii) compare the location of structured data that is currently being displayed by the application software with the location within the structured data for each of the previously reported issues that have not yet been resolved,
    (iii) identify any previously reported and unresolved issues that have a location within the structured data that matches the location of structured data that is currently being displayed by the application software, and
    (iv) display, concurrently with the application software, each of the previously reported and unresolved issues that have a location within the structured data that matches the location of structured data that is currently being displayed by the application software.

3. The computer program product of claim 2 wherein the computer-executable program instructions, when executed, further cause the computing device to:
  (e) during user interaction with the application software:
    (i) compare the location of structured data that is currently being displayed by the application software with the location within the structured data for each of the previously reported issues that have been resolved,
    (iii) identify any previously reported and resolved issues that have a location within the structured data that matches the location of structured data that is currently being displayed by the application software, and
    (iv) display, concurrently with the application software, each of the previously reported and resolved issues that have a location within the structured data that matches the location of structured data that is currently being displayed by the application software
    wherein the display of the resolved issues is only provided for a user who originally reported the issues.

4. The computer program product of claim 1 wherein the database is a log file.

5. The computer program product of claim 1 wherein the computer-executable program instructions, when executed, further cause the computing device to:
  (c) store records of each reported issue in a database, each record further including:
    (iii) results of queries that capture structured metadata related to the reported issue that was not immediately available at the time of reporting.

* * * * *